Jan. 28, 1964   W. MARTIN   3,119,979
WARNING LIGHT AND SWITCH THEREFOR
Filed April 4, 1962
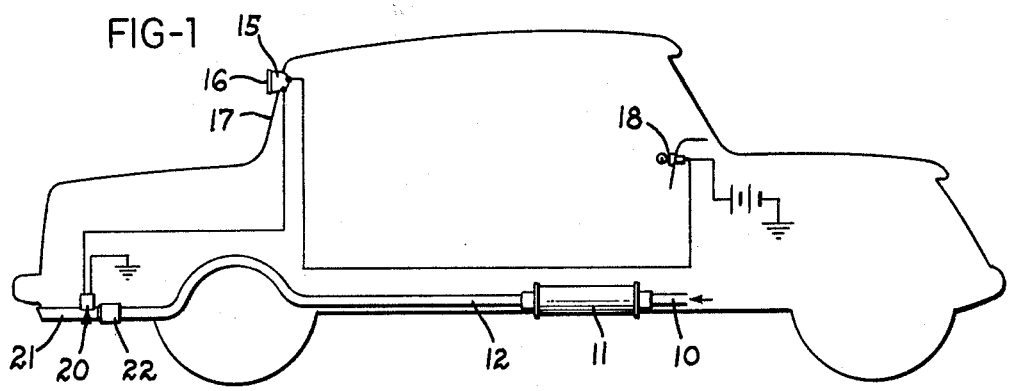
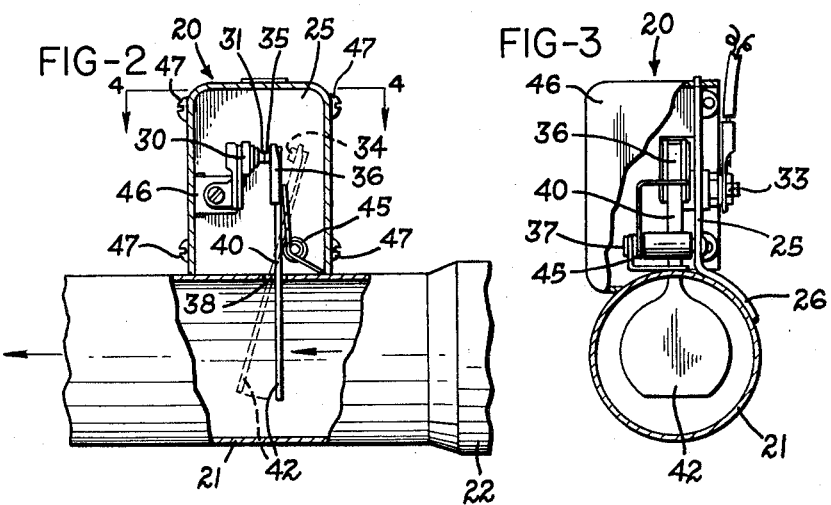
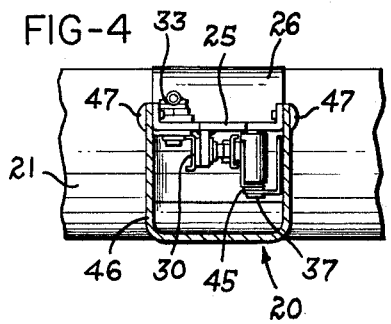
INVENTOR.
WILLARD MARTIN
BY
*Marechal, Biebel, French & Bugg*
ATTORNEYS United States Patent Office 3,119,979
Patented Jan. 28, 1964

3,119,979
WARNING LIGHT AND SWITCH THEREFOR
Willard Martin, R.R. 1, Greensburg, Ind.
Filed Apr. 4, 1962, Ser. No. 185,052
3 Claims. (Cl. 340—52)

This invention pertains to automotive warning lights and more particularly to a rear end collision warning light for automobiles.

The occurrence of rear end collisions has become more numerous with a greater number of automobiles and other vehicles traveling on crowded highways. Often more than two vehicles are involved in so called "chain reaction" accidents. One factor which contributes to such accidents is that the stop lights of a car at the head of a row of automobiles moving in the same direction usually cannot be seen except by the vehicle immediately following the first vehicle. Similarly, the third vehicle sees only the stop lights of the second vehicle. In the case of a panic stop by the first vehicle, the third vehicle does not become aware of these conditions until the stop lights of the second vehicle are observed; and the stop lights of the second vehicle are delayed by reason of the reaction time of the operator of that vehicle. Therefore, the distances between both the second and third vehicles with respect to the first have been decreased by reason of the reaction times of the following vehicles, thereby increasing the likelihood of a rear end collision.

Attempts have been made to provide warning light arrangements which provide some advanced warning of impending or anticipated braking of a motor vehicle. Thus, warning lights have been devised which operate through mechanical connections to the accelerator linkage or to the carburetor or manifold, but these devices have enjoyed limited success due to the relative complexity and cost of installation.

It is therefore an important object of this invention to provide a rear end warning signal lamp arrangement which is of simple construction and positive in operation, where the operation is directly related to changes in power in the vehicle's engine in order to present a warning signal. This is accomplished by an exhaust gas flow responsive switch which is connected to operate a warning light viewable by motorists in following vehicles. This flow responsive switch is held normally open during the times when the engine of the vehicle to which it is attached is developing power, but is arranged to close upon the deceleration of the vehicle to provide an indication or signal.

A further object of this invention is the provision of a signal lamp controlling switch which may be readily attached to the exhaust system of motor vehicles with a minimum of tools and which is dependable and positive in operation.

Another object of this invention is the provision of an automotive safety light including an operating switch which may be connected as a removable extension to the tail pipe of an automobile.

A still further object of this invention is the provision of an automotive safety light which utilizes exhaust gas flow for the operation of a control switch.

Other objects and advantages of the invention will be apparent from the following description, the accompanying drawings, and the appended claims.

In the drawing—

FIG. 1 is a diagrammatic view showing the installation of an automotive safety light according to this invention;

FIG. 2 is an enlarged fragmentary elevational view of the exhaust gas flow responsive switch;

FIG. 3 is a sectional end view of the switch of FIG. 2; and

FIG. 4 is a sectional view of the switch mechanism as viewed generally along the line 4—4 of FIG. 2.

Referring to the drawing, which illustrates a preferred embodiment of this invention, an automotive vehicle to which this invention has been applied is shown in FIG. 1 as including the usual exhaust pipe 10, muffler 11 and tail pipe 12. A signal lamp 15 is mounted at the rear of the vehicle where it may be most advantageously seen by motorists in following vehicles. This lamp is preferably provided with an amber lens 16 and is preferably positioned at or adjacent the upper portion of the rear window 17 so that its signal may be seen by a motorist following two or three cars behind through the windshields of the intervening vehicles.

The operation of safety lamp 15 is preferably controlled through the ignition switch 18 of the automobile or other vehicle on which it is installed in order that the lamp 15 may operate only while the vehicle is running. The operator of the lamp 15 is also controlled through engine power responsive switch means consisting of an exhaust gas operated switch illustrated generally at 20 in FIG. 1.

The switch 20 is shown in enlarged detail in FIGS. 2–4 and preferably includes a short section of pipe 22 which may have one end enlarged, as indicated at 23, for attachment in the same exhaust system of the motor vehicle. Thus, the tube 22 may be attached as an extension at the end of the tail pipe 12, as shown in FIG. 1, or it may be inserted in any other suitable in-line position, such as between the muffler 11 and the tail pipe 12, or ahead of the muffler 11. However, the attachment at the end of the tail pipe 12 as indicated in FIG. 1 is in many ways to be preferred since the tube 22 may be formed as a decorative extension to the exhaust system, with this location affording ease of inspection for the proper operation of the switch.

The switch 20 includes an exhaust gas flow operating member responsive or deflectable upon the flow of exhaust gases for opening and closing a pair of externally mounted contacts which are connected to operate the lamp 15. A preferred embodiment of this switch is shown in FIGS. 2–4 as including an upwardly extending back plate 25 having a lower end 26 secured at the outer surface of the tube 22. An electrically insulated stationary contact 30 is mounted on one side of the plate 25 and fed through to an external binding post 33.

The switch 20 includes a moving grounded contact 35 on the end of an arm 36 mounted for pivotal movement on a post 37 extending from the plate 30 and grounded to the pipe 22 through the post 37. The lower end of the arm 36 extends through a slot 38 in the pipe and is provided with exhaust gas flow responsive member located within the section of pipe 21 consisting of an enlarged deflectable member or flag 40. The impingement of exhaust gases on the surface of the flag 42 causes rotation of the arm 36 on the post 37 and the movement of the movable contact 35 from the closed position as shown in full lines to the open position as shown in broken lines.

Spring bias means for effecting the closing of the contacts 31 and 35 upon the deceleration of the vehicle include a torsion spring 45 wound on the post 37 having one end connected to the arm 36 and arranged to urge the arm 36 and the contact 35 into the closed position. The force of this spring and the area of the flag 42 exposed to the flow of exhaust gases are proportioned to effect the opening of the contacts throughout the time when the engine is developing power, and provides for the closing of these contacts during deceleration. A dust cover 46 may be mounted on the back 25 by screws 47 to protect the contacts from exposure.

The operation of this invention is largely self-evident from the foregoing description. The circuit to the lamp 15 and switch 20 is energized through the ignition switch 18. The return circuit through the battery may be provided through the exhaust system, or if desired, a separate ground wire may be provided connecting the pipe 22 to the chassis.

The lamp 15 will be illuminated through the closed contacts 31 and 35 while the motor is idling, but will be extinguished upon the acceleration of the vehicle and during normal power to maintain forward movement by reason of the impingement of the exhaust gases on the flag 42, and the movement thereof as indicated by the broken lines in FIG. 2 against the torsion spring 45. Upon deceleration, the flow of exhaust gases decreases, permitting the spring 45 to close the contacts, thereby completing a circuit to ground and illuminating the warning or safety lamp 15.

It can be seen that this invention is of simple and inexpensive construction, and is trouble free in operation and does not require any attachment to the accelerator linkage. The switch 20 is adaptable either as an accessory for attachment to the exhaust system or may be built into and form an integral part of the exhaust system. The lamp 15 operates to provide immediate warning to following motorists of deceleration and possible application of the brakes. Due to the placement of the lamp 15, its signal is visible to following motorists two or more cars to the rear. It is fast and dependable in operation and easy to install without special tools or skills.

The invention is not limited for use on automobiles but may be used with any internal combustion engine where a signal is desired. Thus, the invention may be used to signal the stopping or decrease in power of a stationary engine, and may also be used as a safety light on trucks and busses as well as on automobiles.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. An automatic automotive safety light for warning following motorists of deceleration prior to braking by the operator of a vehicle comprising an electric signal lamp mounted on such vehicle at the rear window level for viewing by the following motorists, an exhaust gas flow operated switch mounted on the exhaust pipe from said vehicle's engine including a pair of make and break contacts connected to operate said light, contact operating means including a gas flow responsive member connected to one of said contacts and received in the exhaust pipe of said vehicle, means mounting said member for limited movement upon the impingement thereon of exhaust gases in a direction holding said contacts open when the vehicle is operating under power, and bias means on said contact operating means having a force on said members sufficient to close said contacts upon decrease of exhaust gas flow with deceleration of said vehicle for the illumination of said signal lamp.

2. A rear end collision warning light operating switch, comprising a short section of pipe adapted to be secured as an attachment to the end of the tail pipe of a motor vehicle, a plate secured to an outer surface of said pipe and extending outwardly therefrom, contact means mounted externally of said pipe including a stationary contact mounted on said plate and a cooperative movable contact, a pivoting post, means pivotally mounting said movable contact including an arm pivotally received on said post having an upper end supporting said movable contact and a lower end extending into the interior of said pipe, and a flow deflectable member forming an extension of said arm lower end and positioned in said pipe for exhaust gas impingement thereon for effecting circuit opening movement of said movable contact, and spring bias means on said post having a connection to said arm and arranged to urge said contacts to said closed position with a force which is proportioned to the force of exhaust gases on said member during vehicle deceleration of said member to effect the closing of said contacts upon the deceleration of such vehicle.

3. A warning light switch for attachment to an exhaust pipe of an internal combustion engine, comprising a plate having a lower end adapted for connection to such pipe and extending outwardly therefrom, electrical contact means including a stationary contact and a movable contact, means mounting said stationary contact on one side of said plate, a pivot post on said plate and extending on said one side, movable contact operating means including an arm pivotally mounted on said post having an upper end extending adjacent said one side of said plate and having a lower end adapted to be received within such exhaust pipe, means mounting said movable contact on said upper end of said arm for movement into circuit closing engagement with said fixed contact with pivotal movement of said arm, a flag formed on said lower end received wholly within said exhaust pipe and positioned for the impingement of exhaust gases thereon from said engine tending to move said movable contact apart from said fixed contact, a spring received on said post having one end engageable with said arm and having a fixed end and urging said contacts to said closed position against the force of the impingement of exhaust gases on said flag, the force of said spring and the effective area of said flag being proportioned to effect the closing of said contacts during the periods when said engine is decelerating and said flag being effective to hold said contacts open against the force of said spring during the times when said engine is developing power.

References Cited in the file of this patent

UNITED STATES PATENTS

| | | |
|---|---|---|
| 2,750,578 | Petrella et al. | June 12, 1956 |
| 2,776,441 | Whittle | Oct. 6, 1956 |